July 19, 1938. E. W. AUSTIN 2,123,925
SNOW MOVING DEVICE
Original Filed Jan. 2, 1936
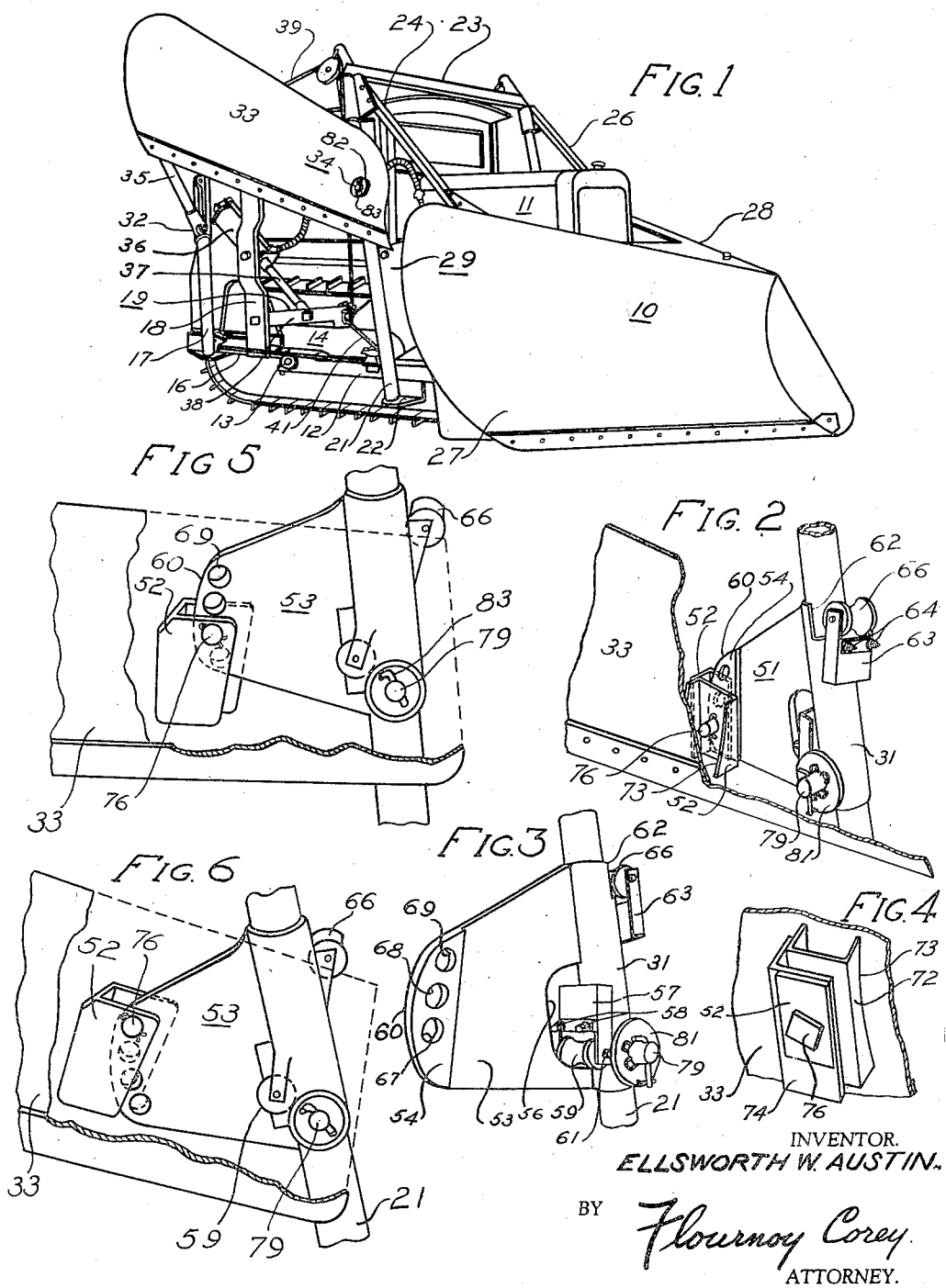
INVENTOR.
ELLSWORTH W. AUSTIN.
BY Flournoy Corey
ATTORNEY.

Patented July 19, 1938

2,123,925

UNITED STATES PATENT OFFICE 2,123,925

SNOW MOVING DEVICE

Ellsworth W. Austin, Cedar Rapids, Iowa, assignor to La Plant Choate Manufacturing Company, Incorporated, Cedar Rapids, Iowa, a corporation of Delaware Original application January 2, 1936, Serial No. 57,091. Divided and this application December 24, 1936, Serial No. 117,490

3 Claims. (Cl. 37—44)

This invention relates to earth and snow moving devices and has particular relation to the mounting of wing plows of such devices. The present application is a division of my co-pending application Serial No. 57,091, filed January 2, 1936, now Patent No. 2,101,666.

In snow removal work, it is customary to employ tractors or like prime movers and to mount V-plows in front of the tractors by adjustable means adapted to vary the position of the V-plow with respect to the ground, in order to vary the depth of the cut.

It is also the practice to mount wing plows at the sides of the prime mover which are adapted to assist the V-plow under certain conditions and to still further widen the cut.

I have found, however, that the means for mounting such devices on the tractor are not always satisfactory for the reason that they cannot be readily adjusted and supported to regulate the angle or slope of the cut which they make. Furthermore, the wing plows are preferably mounted on the tractor in such manner that they may move up and down with reference to the ground level to regulate their depth of cut and such mounting means are not entirely satisfactory for the reason that binding of the plow mounting on the supporting structure and other difficulties sometimes occur.

It is, therefore, a general object of my present invention to provide a new and improved wing plow and means for mounting wing plows.

It is another object of my invention to provide, in connection with a snow plow, a wing plow and means for changing the position of this wing plow with respect to the ground.

It is another object of my invention to provide a wing plow and means for supporting a wing plow such that the wing plow may be used close to the ground to widen a cut, or in elevated position to "bench" a cut, or elevated and tilted position to both bench and slope a cut.

It is a more specific object of my invention to provide means for pivotally engaging a wing plow to a support and slidingly engaging the support to a main supporting member.

Other and further features and objects of my invention will be more apparent to those skilled in the art upon a consideration of the accompanying drawing and following specifications, wherein is disclosed an exemplary embodiment of the invention, with the understanding, however, that such changes may be made therein as fall within the scope of the appended claims without departing from the spirit of the invention.

In said drawing:

Figure 1 is a view in perspective of a wing plow and actuating means when mounted on a tractor in conjunction with a V-plow.

Figure 2 is a fragmentary view in perspective showing the wing plow and having wing plow supporting and mounting structure constructed according to one embodiment of my invention. A portion of the blade has been broken away to better illustrate the parts of the device.

Figure 3 is a view in perspective of a standard and a wing plow support mounted for movement on the standard.

Figure 4 is a view in perspective of an adjusting pin bracket by which the wing blade is adjustably secured to the wing slide member.

Figure 5 is a diagrammatic view of the wing blade and wing blade mounting as it appears with the blade in horizontal position as in benching a cut, and Figure 6 is a diagrammatic view showing the wing blade and wing blade supporting structure as it appears with the blade tilted as in sloping a cut.

Wing plows and wing plow supporting and actuating mechanisms constructed according to my invention may be utilized with any of the usual earth moving structures, but in the present instance I have shown it in connection with a snow plow employing a V-plow mounted on a tractor for vertical adjustment with reference thereto. The V-plow, indicated generally at 10, is supported on and actuated from a tractor or other prime mover indicated generally at 11. In mounting the plow on the tractor, side frames 12 on either side of the tractor are employed, and these side frames are pivotally engaged on stub shafts 13 which extend outwardly on either side of the running gears 14 of the tractor. Beams 16 extend rearwardly from the side frames 12 and rearwardly of the stub shafts 13 and afford means for mounting vertically-extending standards 17 at the rear ends thereof. Other vertically-extending members 18 on the members 16 afford means for mounting and supporting wing plows and wing plow actuating mechanisms, indicated generally at 19, and other standards 21 extend upwardly from brackets 22 near the front ends of the side frames 12. The standards 17 and 21 and the uprights 18 are interconnected to form a rigid structure. The wing plows and wing plow actuating mechanisms form no part of my present invention and, consequently, will not be further discussed.

The standards 21 are connected by cross beams such as 23 to assist in stiffening the plow supporting structure in a transverse direction. Braces 24 and 26 extend forwardly and downwardly from the junctions of members 21 and 23, to the top of the plates 27 and 28 of the V-plow.

The side frames 12 are engaged to the lower rear ends of the V-plow 10 and it is apparent that pivotal movement of the plow and plow supporting structure, about the stub shafts 13, will result in vertical movement of the V-plow to regulate the depth of the cut. The means for securing vertical movement of the V-plow is indicated generally at 29, but since this actuating mechanism also forms no part of my present invention, it will not be further explained except to describe the connection between this actuating mechanism and the plow blade. The actuating mechanism is more particularly described in my co-pending application Serial Number 742,368, filed September 1, 1934.

The V-plow 10 includes the previously mentioned side plates 27 and 28 which are arranged in V-relation and which are curved at a proper angle to roll the snow and other material back upon itself and throw it to one side or the other thus to cause it to be discharged from the rear of the plates 27 and 28 and to one side or the other of the plow.

In order to increase the effectiveness of the snow plow as a whole, it is customary to mount auxiliary plows or blades, called wing plows, one on each side of the tractor, in such positions that they may be used while in the lowered position to widen the cut made by the V-plow, or to be raised for "benching" the side of the cut. The wing plows are made adjustable both up and down as a whole or pivoting about one or more points to vary the angle of cut. They are of material assistance in making cuts to one side or the other of the tractor which the V-plow cannot reach. Of course, the wing plow mounting and supporting structure which I am about to describe may be modified to permit use of the mounting means or the scraper blades or plow blades of other types of earth moving devices.

In mounting a wing plow on the snow plow just described the uprights 17 and 21 afford guides for cylindrical wing slides 31 and 32 which may travel up and down the cylinders or guides 21 and 17. One of the slides 31 is pivotally connected to the front end of the wing blade 33, as indicated at 34, and the other slide 32 is pivotally engaged to a push pole 35, which is in turn pivotally engaged to the rear face of the rear end of the wing blade. Obviously, if the slides 31 and 32 are moved up and down on the uprights 17 and 21, the wing blade 33 will likewise be moved up and down. The wing blade actuating mechanism 19 is employed for this purpose. This actuating mechanism includes a hydraulic jack 36 pivotally engaged on the support 18 and having the ram 37 thereof pivotally attached to a lever 38, one end of which is pivotally engaged to the support 18. Cables 39 and 41 are operatively engaged to the slides 31 and 32, the cable 39 being engaged to the back of the wing blade 33 at a point near the slide 31 and the cable 41 being engaged to the slide 32.

The wing blade mounting and supporting structure includes a wing slide assembly indicated generally at 51 and of which the slide 31 is a part, and an adjusting pin bracket 52 which is welded or otherwise secured to the rear face of the wing blade 33. The wing blade assembly 51 includes the cylindrical slide 31 having a roughly triangular plate 53 extending outwardly therefrom. This plate is preferably reinforced to give it greater thickness at its outer edge indicated at 54. The plate 53 is cut away at 56 to afford a space in which to mount the lower roller bracket 57 on the slide 31. The lower roller bracket 57 is secured to the slide by means of bolts 58 and is cut away to provide space in which the lower roller 59 may be rotatably mounted. The roller 59 is mounted in the lower roller bracket 57 by means of a bolt 61 and the slide 31 is cut away so that the roller 59 bears against the guide 21 to afford rolling contact between the wing slide assembly and the guide 21.

The slide 31 is cut away at the upper forward portion thereof, as indicated at 62, and the upper roller bracket 63 is secured to the front end of the slide as by means of bolts 64. This upper roller bracket 63 is provided with a second roller 66 which is adapted to roll on the cylindrical guide or standard 21. It may be readily understood that the weight of the wing plow 33 causes the lower roller 59 to be biased forwardly against the standard 21 and the upper roller 66 to be biased rearwardly against the front side of the standard 21. The upper roller 66 and lower roller 59 are so positioned by their respective brackets that they bear substantially the entire load of the wing blade 33 on the standard 21, the slide 31 acting merely as a guide member.

The reinforced end 54 of the plate 53 is provided with openings as indicated at 67, 68, and 69. Of course, a greater or lesser number of openings may be used to secure various positionings of the blade as hereinafter described. The upper and outer edge of plate 53 is rounded, as indicated at 60, on approximately the radius of a line from pivot 79 to this edge, to prevent binding of the blade on its support.

The back of the wing blade 33 is provided with an adjustment pin bracket 52 shown more particularly in Figures 2 and 4. The bracket here shown includes a channel member 72, the edges of which are curved as indicated at 73 and secured to the rear face of the blade 33 as by welding. An angle iron 74 is secured with the inside of one of the flanges on the side of the channel 72, to form a box-like bracket open at one side as illustrated. The bracket shown in Figure 4 is a bracket for the left wing plow while the wing plow shown in Figures 1 and 2 is on the right side of the wing blade. In fastening the wing blade to its support the open side of the adjusting pin bracket is placed over the reinforced end 54 of the wing slide assembly plate 53 and the pin 76 passed through the sides of the member 52, and through one of the openings 67, 68, or 69, in the plate 53.

The wing blade is pivotally attached to the slide 31 by means of a wing pivot pin 79, indicated generally at 34, the washers 81 and 82 being employed to assist in holding the wing blade in pivotal engagement on the wing pivot 79, a heavy cotter pin 83 being employed to hold the washers 82 in place.

The action of the wing blade supporting means is shown in the diagrammatic Figures 5 and 6. In the position shown in Figure 5 the pin 76 has been passed through one of the lower openings of the wing slide assembly plate and the wing blade is supported in substantially horizontally-extending position, being supported in the position at two points, one being the wing pivot 79 and the other the adjustment pin 76.

In Figure 6 the pin 76 has been inserted in one of the uppermost openings as 69 and the wing blade is tilted about the wing pivot 79 to an inclined position such as shown which position is particularly desirable in sloping the sides of a cut.

A wing blade supporting and mounting means constructed according to my invention has marked advantages over others known to the art in that the wing blade may be readily raised and lowered without bending and may be readily tilted to vary the angle of cut. Ample support is afforded the wing blades in all positions to meet rolling and twisting forces.

It is apparent that modifications of my invention may be made by those skilled in the art and that such modifications may be made without departing from the spirit and scope of my inventions as set forth in the appended claims.

I claim as my invention:

1. In a snow moving device including a tractor, means for mounting a wing blade on the tractor including a vertically-extending standard, a slide for the standard, a first bracket at the upper forward portion of the slide, and a roller rotatably mounted in the first bracket adapted to bear against the standard, a second bracket at the lower rear portion of the slide and a roller carried by the second bracket adapted to roll on the standard, a plate connected to the slide and extending rearwardly therefrom having the rearmost edge thereof perforated at several points, a third bracket member adapted to fit over this rearmost edge of the plate, a scraper blade rigidly fastened to the bracket, a pin for pinning the third bracket to the plate, and a pivotal connection between the scraper blade and the slide including a stub shaft on the outer lower portion of the slide, the pin for the last named bracket and the stub shaft being in a generally horizontal relation.

2. In a snow moving device including a tractor, means for mounting a wing blade on the tractor including a vertically-extending standard, a slide slidably mounted on the standard and including a plate, the plate having an opening therein adjacent the standard, a roller rotatably mounted on the slide and positioned in the opening in the plate and adapted to bear against the standard, and a wing blade pivoted to the slide and adjustably connected to the plate.

3. In a snow moving device including a tractor, means for mounting a wing blade on the tractor including a vertically-extending standard, a slide slidably mounted on the standard and including a plate, the plate and slide being arranged to provide an opening at the junction of the plate and slide, a roller positioned in the opening at the junction of the plate with the slide and adapted to bear against the standard, and a wing blade pivoted to the slide and having adjustable connection with the plate.

ELLSWORTH W. AUSTIN.